Oct. 22, 1929.                V. J. VASHON                1,732,249
                              AIR GAUGE
                          Filed March 26, 1926
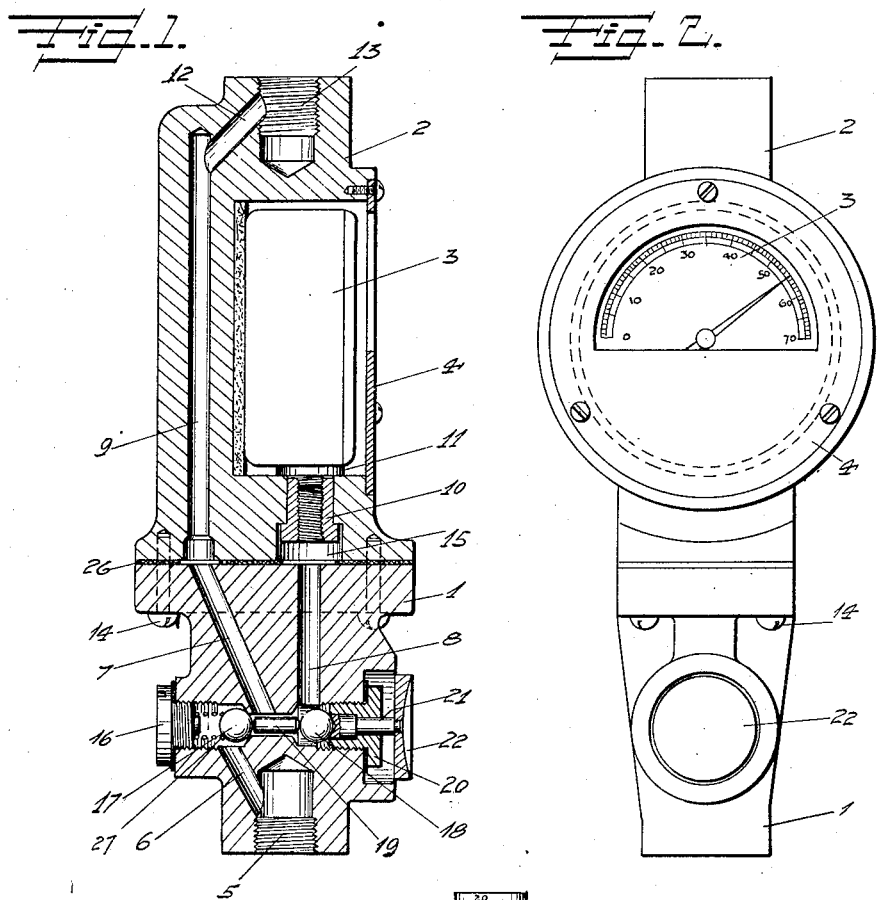
Inventor
Victor J. Vashon
By his Attorney
Joseph Ahern Patented Oct. 22, 1929

1,732,249

UNITED STATES PATENT OFFICE

VICTOR J. VASHON, OF NEW YORK, N. Y.

AIR GAUGE

Application filed March 26, 1926. Serial No. 97,643.

My invention relates to tire inflation devices and the object of my invention is as follows:

First: To produce a simplified form of an inflation device, especially adaptable for inflating automobile tires, and so arranged as to permit a quick and easy attaching or detaching to or from the connecting hose.

Second: To provide an effective valve arrangement easily and simply controlled by a push-button.

Third: To arrange a valve control permitting the control of flow of air to the tire and at the same time disconnect the flow and read the air pressure within the tire.

Fourth: To arrange the device in such a manner as to provide effective protecting means for the valve control and pressure-reading instruments.

Fifth: To design such a device in so simple and effective manner as to permit the production of the same in large quantities at the lowest possible cost of production.

These and other objects I attain by the novel arrangement of various parts and elements as fully described in the specification, and clearly illustrated in the accompanying drawing in which:

Figure 1 represents a section side elevation of a tire-inflating device, embodying the features of my invention.

Figure 2 represents a front view of Figure 1.

Figure 3 represents a sectional view of modified form of the upper portion of Figure 1.

Similar characters refer to similar parts throughout the several views.

The device composes two principal members, the lower a valve member 1, and the upper an indicating member 2.

The lower or valve member 1 is so arranged as to permit the mounting of the upper member 2, by means of screws 14, and a gasket 26 serves the purpose of making the joint perfectly air tight. The valve arrangement provided within member 1 comprises the balls 17, 18 acting as opening or closing means for the control of the flow of the air. The balls are so arranged as to alternately open or close the individual seats, but never open or close at one or the same time. This is accomplished by a connecting member 19, in the shape of a rod, loosely laying in connecting channel, and so dimensioned as to space the balls apart at a predetermined distance.

A spring 27 held in position by a plug 16, normally tends to press ball 17 against its seat and at the same time push ball 18 out of its seat by means of interpositioned rod 19. Ball 18 in turn is pushing against the seat of plunger 21, which plunger is securely fastened to a push-button 22. Plunger is guided within a suitable bushing 20 and well fitted into the same, to prevent any leakage of air through the same.

The lower portion of member 1 is provided with a suitable threaded connecting hole 5, from which a smaller canal 6 leads into the chamber of ball 17. Another canal 7 leads from a communicating hole to the surface of the joint and into a canal 9 of upper member 2. Canal 12 in turn leads into another connecting threaded hole 13, similar to the one provided in member 1. Still another canal leads from the chamber of ball 18 to the surface of the joint and is met by communicating member 15 in member 2. A bushing 10, connects to a nipple 11, forming the inlet to pressure reading instrument 3. Instrument is mounted within a receptacle provided in member 2 and suitably protected by perforated cover disc 4. A gasket is provided for protective purposes.

The device operates as follows: The hose of air pump is connected to threaded hole of member 1, while the tire of an automobile is connected to threaded hole 13 by means of another length of hose. Now assuming that air is to be forced into the tire. For this purpose button 22 is pressed into its recess, at the same time plunger 21 presses ball 18 into its seat, ball 18 in turn pushes ball 17 out of its seat by means of connecting rod 19. In this position the air will enter chamber, pass around ball 17 into the communicating hole 7, from which it will pass into channels 9 and 12, and through threaded hole 13, into the tire of the automobile.

In case it is desired to read the pressure in the tire, button 22 is to be released, thus ball 17 is pushed against its seat by spring 27, by which action ball 18 will be pushed out of its seat and the tire air pressure may be readily read upon the instrument, the air being admitted through canal 8, communicating hole 15, chamber 10, and into instrument 3.

Having thus fully described and illustrated my invention, I do not wish to limit myself to the exact details as shown, it being apparent that there may be considerable variation in utilizing the principles disclosed without departing from the spirit of my invention.

What I claim as new and desire to secure by Letters Patent is:

A device of the character described comprising, in combination, two separable members, each having a flat face, a gasket, means for securing said members one to the other with said faces in engagement with said gasket, whereby an air tight joint is provided, a pressure gauge in one of said members, a valve chamber in the other member, an air passage through said valve chamber containing member leading to said valve chamber for connection to a source of air supply, an air passage through both said members and said gasket leading from said valve chamber to said gauge, an additional air passage through both said members and said gasket leading from said valve chamber for connection to a tire, and a duplex valve in said valve chamber adapted to selectively connect said first and last named passages or said second and last named passages.

Signed at the city of New York, in the county of New York and State of New York, this 23rd day of March, A. D. 1926.

VICTOR J. VASHON.